United States Patent
Levin et al.

(10) Patent No.: US 12,131,332 B2
(45) Date of Patent: *Oct. 29, 2024

(54) METHODS, SYSTEMS, AND NON-TRANSITORY COMPUTER-READABLE MEDIUMS FOR PRODUCT CATALOG MAPPING AND INTEGRATION ACROSS DISTRIBUTED SYSTEMS AND INTERFACES, DYNAMIC DETERMINATION AND PRESENTATION OF CUSTOMIZED SERVICE OFFERS AND LIFECYCLE MANAGEMENT OF SERVICES

(71) Applicant: Extend, Inc., Covina, CA (US)

(72) Inventors: Woodrow Horwitz Levin, San Francisco, CA (US); Rohan Ajay Shah, Los Altos Hills, CA (US); Michael Ross Darmousseh, Rockwall, TX (US); Joseph Glen Moss, Danville, CA (US)

(73) Assignee: Extend, Inc., Covina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,489

(22) Filed: Dec. 15, 2022

(65) Prior Publication Data

US 2023/0206247 A1 Jun. 29, 2023

Related U.S. Application Data

(60) Provisional application No. 63/294,654, filed on Dec. 29, 2021.

(51) Int. Cl.
*G06Q 30/00* (2023.01)
*G06Q 30/012* (2023.01)
*G06Q 30/0601* (2023.01)

(52) U.S. Cl.
CPC ....... *G06Q 30/012* (2013.01); *G06Q 30/0603* (2013.01); *G06Q 30/0635* (2013.01)

(58) Field of Classification Search
CPC ............. G06Q 30/012; G06Q 30/0603; G06Q 30/0635

(Continued)

(56) References Cited

U.S. PATENT DOCUMENTS 7,155,409 B1 12/2006 Stroh
9,123,069 B1 9/2015 Haynes (Continued)

OTHER PUBLICATIONS

DHgate.com partners with SquareTrade to offer protection plans for all consumer electronics: Cross-border E-commerce marketplace becomes first chinese E-commerce company to offer leading consumer-rated warranties. (Oct. 27, 2014). PR Newswire Retrieved from https://www.proquest.com/wire-feeds/dhgate-com-partners-with-squaretrade-offer/docview/1616450406/se-2 (Year: 2014).*

(Continued)

*Primary Examiner* — Arielle E Weiner
(74) *Attorney, Agent, or Firm* — Sheppard Mullin Richter & Hampton LLP

(57) ABSTRACT

Embodiments of the presently disclosed technology provide systems and methods for catalog integration across distributed systems and interfaces. Such systems and methods may involve: (1) receiving, at an integration platform, a catalog of items from a merchant, the catalog of items including a first item; (2) determining, by the integration platform, a set of protection plan offers to display in a live website associated with the merchant, the live website displaying the first item with a frame object comprising the set of protection plan offers; (3) receiving, by the integration platform, a notification related to a transaction involving the first item and a customer; and (4) performing, by the integration (Continued)

platform, an action associated with the transaction and a first protection plan offer of the set of protection plan offers.

20 Claims, 19 Drawing Sheets

(58) Field of Classification Search
USPC ....................................................... 705/26.81
See application file for complete search history.

(56) References Cited

U.S. PATENT DOCUMENTS

| | | | |
|---|---|---|---|
| 2002/0188482 A1 | 12/2002 | Friend | |
| 2003/0061104 A1* | 3/2003 | Thomson | G06Q 30/02 |
| | | | 705/26.1 |
| 2008/0033821 A1 | 2/2008 | Jacobi | |
| 2008/0095441 A1 | 4/2008 | Rosskamm | |
| 2011/0161149 A1 | 6/2011 | Kaplan | |
| 2011/0225047 A1* | 9/2011 | Breed | G06Q 30/02 |
| | | | 705/14.69 |
| 2013/0013517 A1* | 1/2013 | Gallego | G06Q 30/012 |
| | | | 705/302 |
| 2014/0214456 A1 | 7/2014 | Vasavada | |
| 2015/0348282 A1 | 12/2015 | Gibbon | |
| 2016/0063564 A1* | 3/2016 | Ward | G06Q 20/202 |
| | | | 705/14.65 |
| 2018/0204281 A1* | 7/2018 | Painter | G06Q 30/0641 |
| 2018/0225673 A1* | 8/2018 | Dubey | G06Q 10/10 |
| 2018/0268418 A1* | 9/2018 | Tanksali | G06Q 30/012 |
| 2019/0057454 A1 | 2/2019 | Komenda | |
| 2023/0037216 A1* | 2/2023 | Way | G06Q 30/018 |
| 2023/0153885 A1* | 5/2023 | Mossoba | G06Q 30/0631 |
| | | | 705/26.7 |

OTHER PUBLICATIONS

Fryer, Victoria, "What Is Shipping Protection? (+ See How it Benefits Merchants and Their Consumers)", Extend, Aug. 3, 2022 (Aug. 3, 2022), Retrieved on Jun. 3, 2023 (Jun. 3, 2023) from <URL: https://www.extend.com/post/what-is-shipping-protection>, 13 pages.

Sullivan, Aaron, "How Product Protection Fits Into Your Omnichannel Customer Experience—And Improves Profitability", Extend, Nov. 28, 2022 (Nov. 28, 2022), Retrieved on Jun. 3, 2023 (Jun. 3, 2023) from <URL: https://www.extend.com/post/omnichannel-customer-experience-and-product-protection>, 11 pages.

Clyde, "Clyde Guide", [online] [retrieved on Mar. 4, 2023], retrieved from the Internet at <URL: https://www.youtube.com/watch?v=pxPWDgzYm10>, Sep. 3, 2018, 10 pages.

* cited by examiner

| Enable Protection Offers | Yes ▶ |
| Balanced Cart | Yes ▶ |
| Display Cart Offers | Yes ▶ |
| Enable Refunds | Yes ▶ |

FIG. 4

| Mode (website) | Live ✓Sandbox |
| --- | --- |
| ID (website) | |

Unique identifier for your store on the Extend platform. Go to your Extend merchant dashboard to find your StoreID and then paste or type it here.

| API Key (website) | ☐ |
| --- | --- |

Access token which is required for all API communications between your Magneto store and the Extend platform. You can view and manage your API Key on your Extend merchant dashboard.

| SandBox Store ID (website) | |
| --- | --- |

Unique identifier for your store on the Extend platform. Go to your Extend merchant dashboard to find your StoreID and then paste or type it here.

| SandBox API Key (website) | ************************************ ☐ |
| --- | --- |

Access token which is required for all API communications between your Magneto store and the Extend platform. You can view and manage your API Key on your Extend merchant dashboard.

FIG. 5

Items Ordered

[Add Products]

| Product | Price | Qty | Subtotal | Discount | Row Subtotal | Action |
|---|---|---|---|---|---|---|
| Maxxwave 5Vdc Switching Power Supply (10W)<br>SKU: 05POW | $2.75<br>☐ Custom Price* | 1 | $2.75 | $0.00<br>☑ Apply | $2.75 | Please sele ▼ |
| 1510 | | | | | | |
| [Add accident protection for $1.99] | | | | | | |

>

Items Ordered

[Add Products]

| Product | Price | Qty | Subtotal | Discount | Row Subtotal | Action |
|---|---|---|---|---|---|---|
| Maxxwave 5Vdc Switching Power Supply (10W)<br>SKU: 05POW | $2.75<br>☐ Custom Price* | 1 | $2.75 | $0.00<br>☑ Apply | $2.75 | Please sele ▼ |
| Extend Protection Plan<br>SKU: WARRANTY-1 | $5.49<br>☑ Custom Price*<br>5.49 | 1 | $5.49 | $0.00<br>☑ Apply | $5.49 | Please sele ▼ |
| Total 2 product(s) | | | Subtotal: | $8.24 | $0.00 | $8.24 |

FIG. 15

Items Ordered

| Product | Item Status | Original Price | Price | Qty | Sub total | Tax Amount | Tax Percent | Discount Amount | Row Total |
|---|---|---|---|---|---|---|---|---|---|
| Joust Duffle Bag SKU: 24-MB01 | Shipped | $34.00 | $34.00 | Ordered 1 Invoiced 1 Shipped 1 | $34.00 | $0.00 | 0% | $0.00 | $34.00 |
| Extend Protection Plan SKU: WARRANTY-1 | Invoiced | $0.00 | $5.99 | Ordered 1 Invoiced 1 | $5.99 | $0.00 | 0% | $0.00 | $5.99 | Request Refund 1710 |

FIG. 17

METHODS, SYSTEMS, AND NON-TRANSITORY COMPUTER-READABLE MEDIUMS FOR PRODUCT CATALOG MAPPING AND INTEGRATION ACROSS DISTRIBUTED SYSTEMS AND INTERFACES, DYNAMIC DETERMINATION AND PRESENTATION OF CUSTOMIZED SERVICE OFFERS AND LIFECYCLE MANAGEMENT OF SERVICES

REFERENCE TO RELATED APPLICATION

The present application claims priority to U.S. Patent Application No. 63/294,654 filed Dec. 29, 2021 and titled "PRODUCT CATALOG MAPPING AND INTEGRATION ACROSS DISTRIBUTED SYSTEMS AND INTERFACES, DYNAMIC DETERMINATION AND PRESENTATION OF CUSTOMIZED SERVICE OFFERS AND LIFECYCLE MANAGEMENT OF SERVICES," which is incorporated herein by reference in its entirety.

TECHNICAL FIELD

The disclosed technology relates to technical improvements to systems for product catalog mapping and integration across distributed systems and interfaces, dynamic determination and presentation of customized service offers (e.g., product protection, shipping protection, etc.) at the point of sale, and lifecycle management of the services (e.g., including automated processing and adjudication of protection plan claims).

BACKGROUND

Merchants that sell products often sell related services. Various types of add-on services (e.g., product protection plans, shipping protection plans, etc.) for consumer product purchases are known. For many purchases, whether in person or online, the process for purchasing the service is inefficient for many reasons. This includes drawbacks due to the lack of integration between point-of-sale systems and service providers (along with other limited or ineffective technological implementations of existing systems). One problem with existing systems is the lack of information (or current information) readily accessible to merchants regarding related services that are available for a product being purchased by a given customer. The process of merchants receiving information from service providers (e.g., protection plan service providers, shipping protection plan service providers, etc.) is often not automated or not fully automated and this leads to many drawbacks.

Moreover, once a consumer purchases a service or protection plan, it is often difficult to submit a claim (e.g., a protection plan claim, a shipping protection plan claim, etc.). This, too, is due at least in part to limitations of existing technology systems. Often the protection plan is processed by a separate entity with a separate information technology system. If the protection plan service provider denies a claim, it is often difficult for a consumer to contact the protection plan service provider to dispute the claim.

For at least these reasons, the lack of technology or ineffective technology is a drawback with respect to offering and managing services that are offered to consumers in connection with product purchases.

SUMMARY

One aspect of the invention relates to a technology platform for product catalog mapping (e.g., by manufacturer and/or merchant) and integration across distributed systems and interfaces, dynamic determination and presentation of customized service offers (e.g., product protection or shipping protection) related to products as part of a user work flow (e.g., as part of product search, selection and/or at the point of sale), and lifecycle management of the services (e.g., including automated processing and adjudication of protection plan claims). The system may include digitally native claim adjudication, including a multilayer chat application/bot to ensure eligibility, help file a claim by asking relevant questions (using e.g., a decision tree, AI, ML technology, or other suitable techniques), process the claim, generate automated claim approval and/or automate obtaining repair/replacement of the product for the customer.

The system includes a computer-implemented offer management system, an offers management administrative module, a rules system for storing and managing rules and processing offer rules in real-time, one or more offers APIs, a set of offer management interfaces and other technology and components as set forth herein. The Offers Management System (e.g., a computing platform comprising a processor and memory that can help create the infrastructure and platforms necessary to continuously manage protection plan and shipping offers) creates the capability to easily manage consumer pricing tests, copy, images, and design elements of offers (e.g., product protection plans, shipping services, shipping protection plans, or other plan offers) in real-time. It creates the infrastructure and platforms necessary to continuously optimize offers in real-time to maximize the benefits of the offers for the merchant, consumers and protection plan service providers. The Offers Management System includes a set of connected platforms to manage all aspects of Offers. It can include the Offers Management Administrative module (e.g., an interface in a merchant-accessible portion of the platform to allow the merchant to control various aspects of offers), Rules System (e.g., a system that allows merchants and other authorized users to manage offers without the need for computer development work), Offers API (e.g., an interface that provides customized offers to merchants from an easy to integrate module or component), Content Management System (e.g., a system that stores strings and marketing assets for offers, including one or more templates that may be used to render offers), Lead Tokens (e.g., a unique identifier encoded with the offer that may be returned by the Offers API), Offer Rendering (e.g., a set of computer rules that help programmatically render frame objects or other information to the consumer device through Modal, Cart, or other user interface features during the purchase experience), and other components.

The Offers Management Administrative module includes an interface that enables interaction with the Rules System. It enables merchants and other authorized users to present relevant available services to the consumer in real time using various rules detailed below. The rules may include various factors including offer price, the merchant, product type, term length, coverage type, service type, region, subregion and/or other factors. This enables real-time dynamic offer determination and pricing.

A Rules Creator Interface enables authorized users (e.g., system administrators, merchants, and/or other authorized users) to create rules to manage all aspects of the Offer. A Rules Simulator enables authorized users to see an output, given certain inputs, as a way to check the actual output matches the expected output. A Rules Viewer Dashboard details all active and past rules and allows those rules to be edited.

The Rules System is part of the Offers Management System. It reads inputs, computes an output, and serves that output to the Offers API so that the Offer can be created in real time. The Rules Evaluator computes the rules inputted into the Rules Creator and produces an output (consumer price test, no Offer because of consumer geographic eligibility, etc.). The Offers API delivers customized Offers to merchants from an easy to integrate component. The Offers API is the delivery mechanism of the Offers Management System; the Offers API will create and return custom Offers via a token that will traverse the system; these tokens are stored for analytical, historical, and tracking purposes. The Offers API will also serve as the method for merchants to create and update products.

The Content Management System ("CMS") is a computer-implemented service that enables various stakeholders (Product Marketing/Design) to manage offer content customization. The CMS may store a catalog of templates. Each template may represent one offer rendering. These templates may be created and approved by Design and Product Marketing and stored.

The system may use an Offer Token such that an Offer is encoded in a token that tracks or follows the consumer's purchasing workflow and is returned by the Offers API, or in the case of a purchase, the Orders API. Offer Rendering on the merchant's site includes outputs from the Rules Evaluator.

The process may include some or all of the following steps. An entity (e.g., a merchant) integrates its web store and syncs its product catalog with the offer management system. The system maps services (e.g., product protection, shipping protection, and other protection plans) for the products. As a consumer searches, selects and/or purchases a product, the system can dynamically determine relevant offers based on various criteria (e.g., location, dynamic pricing and other factors). The offers may be presented at various points in the consumer product purchase workflow (e.g., Product Detail Page, Interstitial Modal, the Shopping Cart and other locations). If a protection plan or other add-on service is selected by the consumer, the SKU for the protection plan (or other service identifier) is added to the user's electronic shopping cart. To facilitate contract management and lifecycle management and integration in the system, whenever an order is created and invoiced that contains a service (e.g., product protection, shipping protection, etc.), the system will create a service contract in the system for that customer (e.g., a customer for a particular store). The order will contain the protection plan with the corresponding pricing based on a selected time period (e.g., 1 year, 2 year, or 3 year protection plan selected by the customer).

The system may create a data structure including key fields such as the product reference ID, the plan Id for the plan that was purchased, the customer's email address and/or other information as may be necessary or desired. The system may automatically register the protection plan (e.g., with a manufacturer or other protection plan provider) and send the customer an email with the protection plan summary and terms. When the customer has a claim, the system implements a protection plan claims adjudication component that is part of the system, including a chat application/bot to determine eligibility, gather information by asking relevant questions, facilitate automated claim approval and automatically assist in obtaining a repair/replacement of the product for the customer.

Systems, methods, and computer readable media are disclosed for implementing an integration system across distributed systems and interfaces. The integration system can provide computer-implemented components for incorporating a catalog of items with electronic protection plan offers that correspond with items. Once one or more protection plan offers are identified for an item, visual representations of the protection plan offers may be integrated as frame object components at a network document (e.g., webpage) associated with a merchant system from the integration system that is remote from the merchant system.

Some aspects of the invention relate to technical improvements to various aspects of the foregoing system. Some of these technical improvements include enhanced technology for dynamic claims adjudication, where a bot is configured to dynamically adjudicate a claim via the ability to configure different questions/response paths for adjudicating claims via the chatbot and/or internal claims administrator tools (e.g., for customer service agents taking claims via phone) and/or merchant claims admin tools. Customizations may be configured manually on the platform and then automatically served when claim is initiated for different protection plans.

Another technical improvement includes dynamic messaging in offers. Rather than provide static offer messages, the offer system can be configured to customize the text in protection plan offers and info pages for different product categories or merchants. Customizations may be configured manually on the platform and then automatically served when an offer is displayed in different merchant stores.

Another technical improvement includes a merchant agent claims portal where merchant customer service agents can log into a portal and be automatically guided through an online form to process a claim. The form may dynamically display correct question/response flow for that merchant/protection plan.

Another technical improvement includes real-time automated product protection plan mapping, including the ability to map a product not previously known to the offer management system to a protection plan at the time of product protection plan offer, based on product category information and/or machine learning models involving other product data. In some examples, a machine learning (ML) model may be implemented for product catalog protection mapping.

Another technical improvement includes technology to provide and manage multiple services via order data. Historically, a merchant would have separate integration points to report a protection plan sale to the offer management system (e.g., via the Create Contract API), report a sale of a protectable item without a protection plan (e.g., via the Create Lead API), cancel a contract (e.g., via a Refund API), and to create or update products on the offer management system, where the services all related to a particular service (e.g., a protection service). An improved orders API is configured to enable merchants to report the contents of a customer order and the offer management system can support the order by providing, for example, protection plan creation, lead creation, product creation and updates, protection plan cancellation/refunds, handling for products that are shipped much later than the order date (which affects protection plan coverage dates), shipping protection sales, offer management system managed OEM protection plan services, returns management, and other post-purchase services.

Another technical improvement includes a dynamic offers rules engine which is configured to enable authorized users to create and store rules for controlling what coverages are offered and how they are priced, messaged, and displayed. This enables testing and optimization and can satisfy merchant-specific rules.

Another technical improvement includes a multi-tenancy management component which is configured to enable related entity management (e.g., a parent merchant with child stores) in the same account on a protection plan technology platform (i.e., Logitech with all its sub-brands can be centrally managed, but each store has discrete products and protection plan programs).

Some Newer Projects:

The integration system may also implement a chatbot at a network document (e.g., webpage) associated with the merchant system. The chatbot receives questions and provides answers by following a pre-determined decision tree of questions and inputs based on protection plans, merchant information, and product information. For example, the chatbot may assist a consumer user by answering questions or providing information about one or more protection plan offers for an item. In another example, the chatbot may configure different question and response paths for adjudicating claims for the consumer user, an internal claims administrative user (e.g., for customer service agents taking claims via phone), or merchant claims administration tool.

The integration system may also implement a contract management engine to customize text in protection plan offers and information pages at the network document. The information may provide descriptions of items or merchants, item categories, or other relevant information about protection plan offers for consumer users. The contract management engine can provide text to the network document that is manually entered by an administrative user and/or automatically provide the information when a protection plan offer is displayed.

The integration system may also implement a lead token engine to identify that an item was purchased without a corresponding protection plan offer. The lead token may identify a consumer user to contact after a purchase of the item to follow up with another offer to acquire a protection plan.

The integration system may also implement an administration module to provide information for administrative and merchant users. For example, a merchant customer service agent can log into an interface of the integration system and be walked through an online form that teaches the agent how to determine information to generate a claim. The interface may dynamically display a correct question and response flow for a particular merchant or protection plan (e.g., based on a decision tree, a trained ML model or other suitable techniques). For example, the interface may identify a customer and a protection plan about which the customer is filing a claim using the provided information. Once the protection plan contract is identified, the interface can look up a correct decision tree to use. The decision trees may be generally associated with a protection plan, but there can be decision tree branches that are specific to a merchant or product category. The interface can then walk the customer through a series of questions and customer inputs based on the selected decision tree. Here the customer's path through the decision tree may differ based on customer inputs. For example, in a furniture claim, one question in the decision tree may be whether the damage is a tear or a stain, and if the customer selects "stain" then the next question will be about the type of stain.

The integration system may also provide real-time automated mapping between a protection plan offer and an item. For example, the system may have the ability to map an item not previously stored in an item catalog data store and map the item to a protection plan offer in real-time. The mapping may be based on item category information and/or a trained ML model involving other item data.

The integration system may also implement an action engine to provide one or more services (e.g., using order data, protection plan offer information, or consumer user information). For example, the system may initiate support for merchants by creating a protection plan based on a purchased protection plan offer, create a lead token associated with a potential future consumer, create items with corresponding information, cancel or update protection plan offers, initialize a refund process, update protection coverage dates based on delayed shipping timelines from the order date, generate a shipping protection order, and initiate original equipment manufacturer (OEM) protection plan services, returns management, or other post-purchase services.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4 illustrates a configuration interface, in accordance with the embodiments disclosed herein.

FIG. 5 illustrates an authentication interface, in accordance with the embodiments disclosed herein.

FIG. 15 illustrates manually adding a protection plan offer to an item order, in accordance with the embodiments disclosed herein.

FIG. 17 illustrates an interface for initiating a return process, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
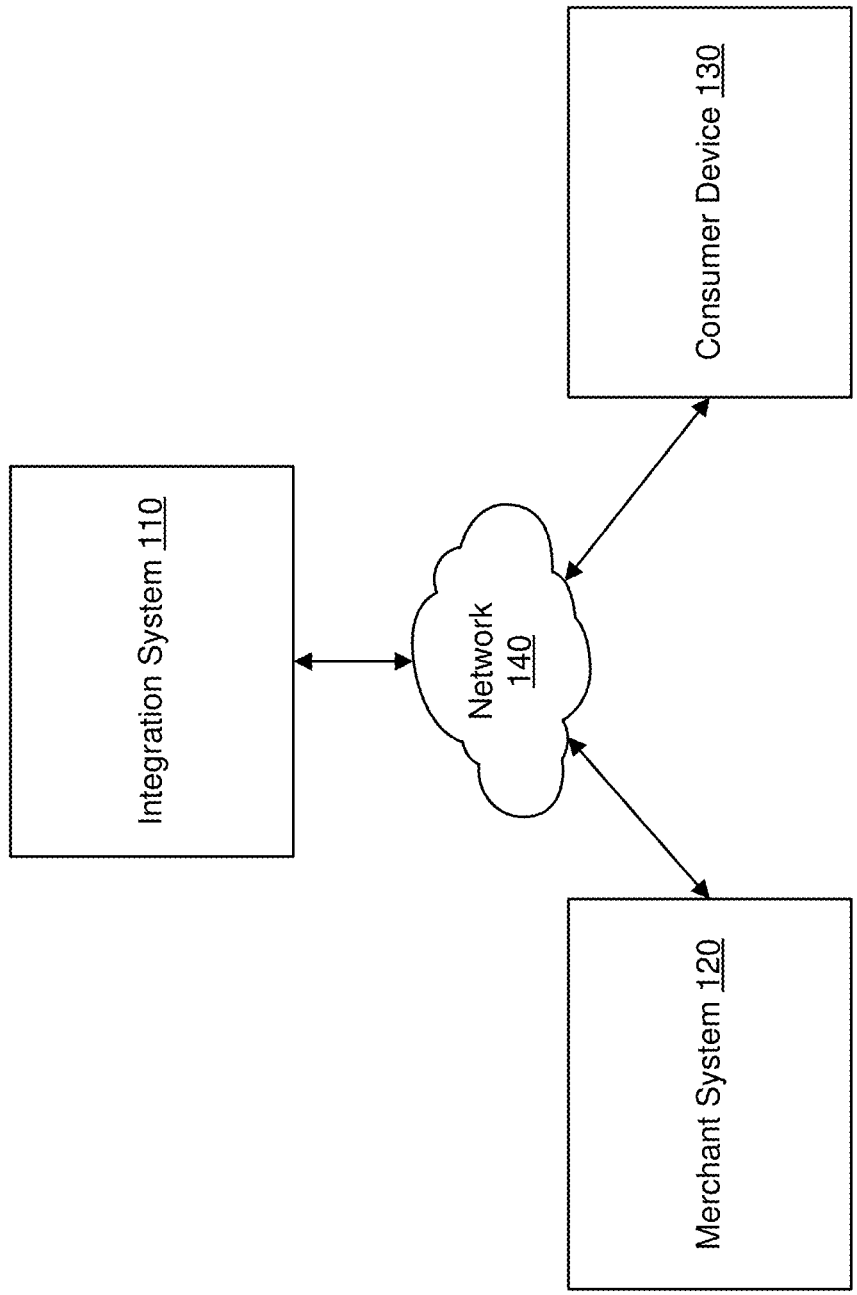
FIG. 1 illustrates a distributed environment for implementing catalog integration across distributed systems and interfaces, in accordance with the embodiments disclosed herein.

FIG. 1 illustrates a distributed environment for implementing catalog integration across distributed systems and interfaces, in accordance with the embodiments disclosed herein. In this illustration, integration system 110, merchant system 120, and consumer device 130 may communicate via network 140 in a distributed communication environment.

Figure 2:
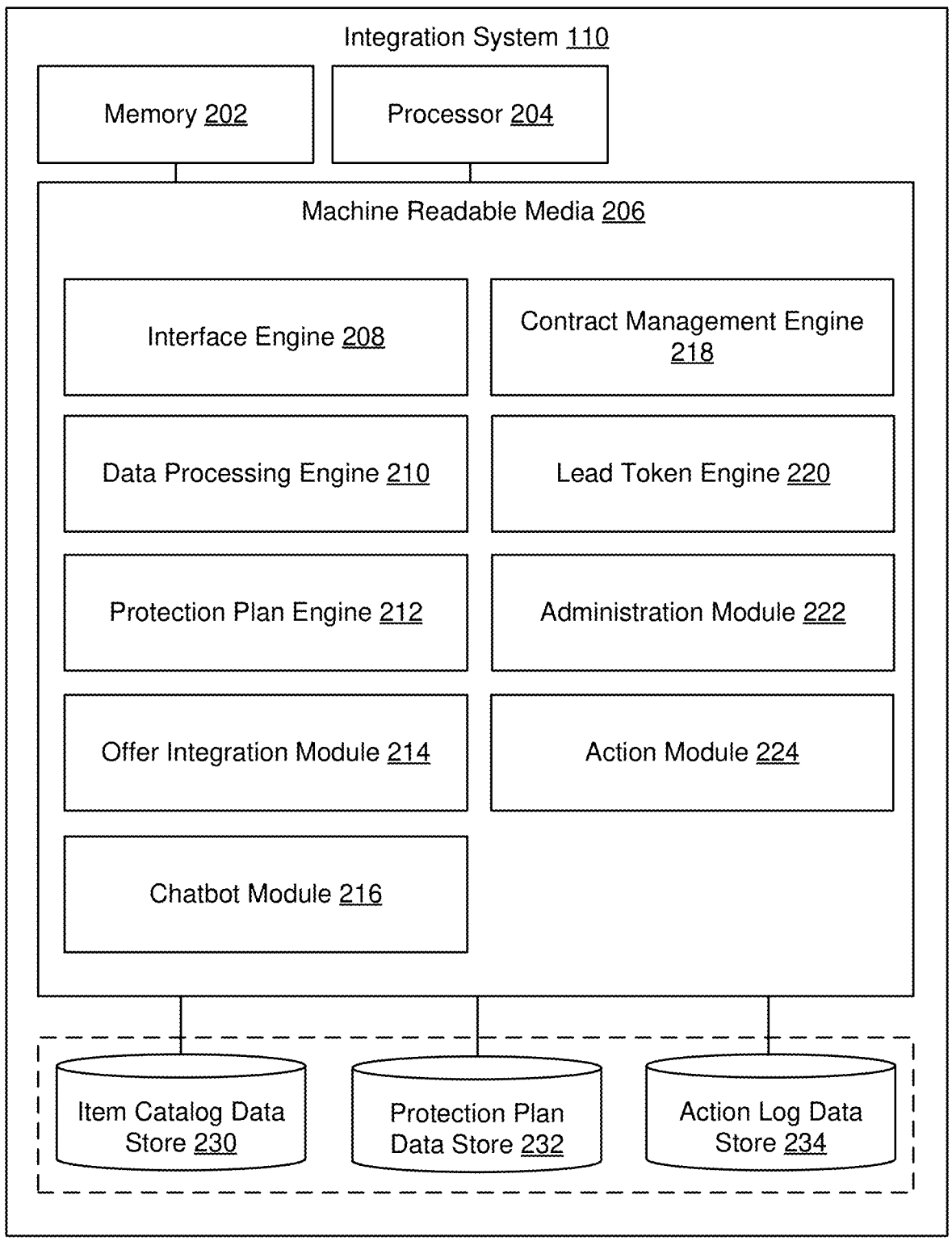
FIG. 2 illustrates an integration system, in accordance with the embodiments disclosed herein.

Additional details associated with integration system 110 are illustrated in FIG. 2. Integration system 110 may comprise, for example, memory 202, processor 204, machine readable media 206, and one or more data stores, including item catalog data store 230, protection plan data store 232, and action log data store 234.

Memory 202 may comprise random-access memory ("RAM") or other dynamic memory for storing information and instructions to be executed by processor 204. Memory 202 might also be used for storing temporary variables or other intermediate information during execution of instructions to be executed by processor 204. Memory 202 may also comprise a read only memory ("ROM") or other static storage device coupled to a bus for storing static information and instructions for processor 204.

Processor 204 may comprise a general-purpose or special-purpose processing engine such as, for example, a microprocessor, controller, or other control logic. Processor 204 may be connected to a bus, although any communication medium can be used to facilitate interaction with other components of integration system 110 or to communicate externally.

Machine readable media 206 may comprise one or more interfaces, circuits, and modules for implementing the functionality discussed herein. Machine readable media 206 may carry one or more sequences of one or more instructions to processor 204 for execution. Such instructions embodied on machine readable media 206 may enable integration system 110 to perform features or functions of the disclosed technology as discussed herein. For example, the interfaces, circuits, and modules of machine readable media 206 may comprise, for example, interface engine 208, data processing engine 210, protection plan engine 212, offer integration module 214, chatbot module 216, contract management engine 218, lead token engine 220, administration module 222, and action module 224.

Figure 3:
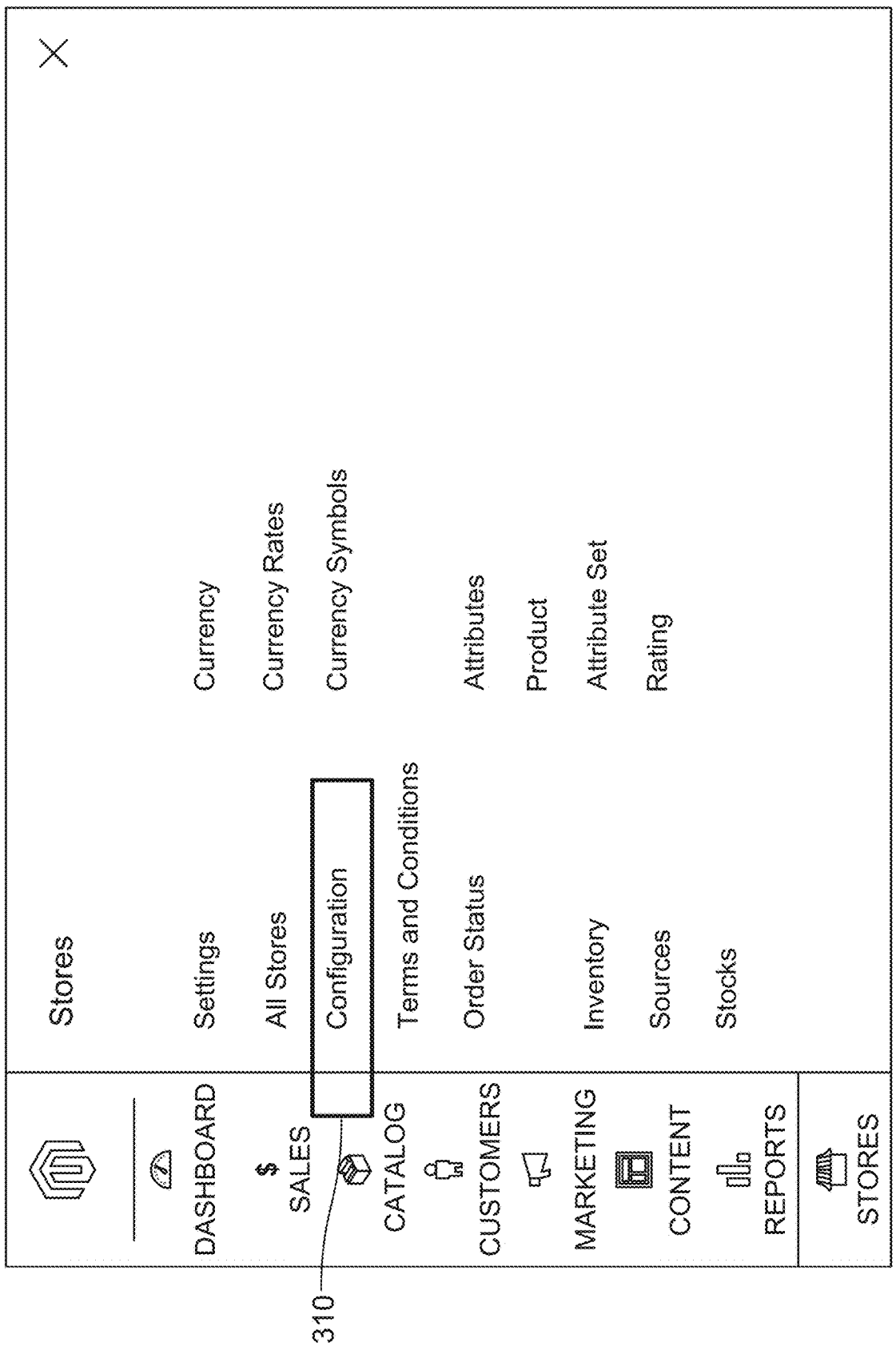
FIG. 3 is an illustrative interface to receive configuration information, in accordance with the embodiments disclosed herein.

Interface engine 208 may also be configured to receive configuration information from an administrative user. An illustrative interface is provided with FIG. 3, which is an interface to receive administrative user configuration information to begin providing product protection plan offers in association with a merchant user. For example, an administrative user may activate tool 310 to provide administrative user configuration information and protection plan offer information to interface engine 208. The information may be stored with protection plan data store 232. Activation of tool 310 may provide the ability to configure protection plan offers by creating a new administrative account or by providing credentials from an existing account associated with administrative user configuration information.

FIG. 4 illustrates a configuration menu, in accordance with the embodiments disclosed herein. In this illustration, various drop-down options are provided to configure a network document associated with a merchant user. The configuration menu may enable the user to select the individual features to leverage with merchant system 120, including providing protection plan offers and creating service contracts, balanced cart, display cart offers, and enable refunds.

By activating the "balanced cart" option, the module may automatically handle cart balancing for protection plan orders. For example, if a consumer user increases or decreases the quantity of items, the quantity for the related protection plan offers in the cart should also increase or decrease. In addition, if a consumer user has completely removed a product from the cart, any related protection plan offers should be removed from the cart as well so the consumer user does not accidentally purchase a protection plan without the corresponding item.

By activating the "display cart offers" option, the module enables the ability to present protection plan offers directly in the shopping cart. The items may have been stored with item catalog data store 230, mapped with one or more protection plan offers stored in protection plan data store 232, and are live at merchant system 120.

By activating the "enable refunds" option, the module may enable a process that can automatically process refunds for protection plan offers.

Interface engine 208 may be configured to adjust authentication settings, as illustrated in FIG. 5. The authentication settings may include, for example, mode, identifier (ID), API key, Sandbox® store ID, and Sandbox® API key. "Mode" may identify types of authentication, including live authentication or external authentication (e.g., via Sandbox®) that are passed to interface engine 208 (e.g., vi a secure authentication channel).

Figure 6:
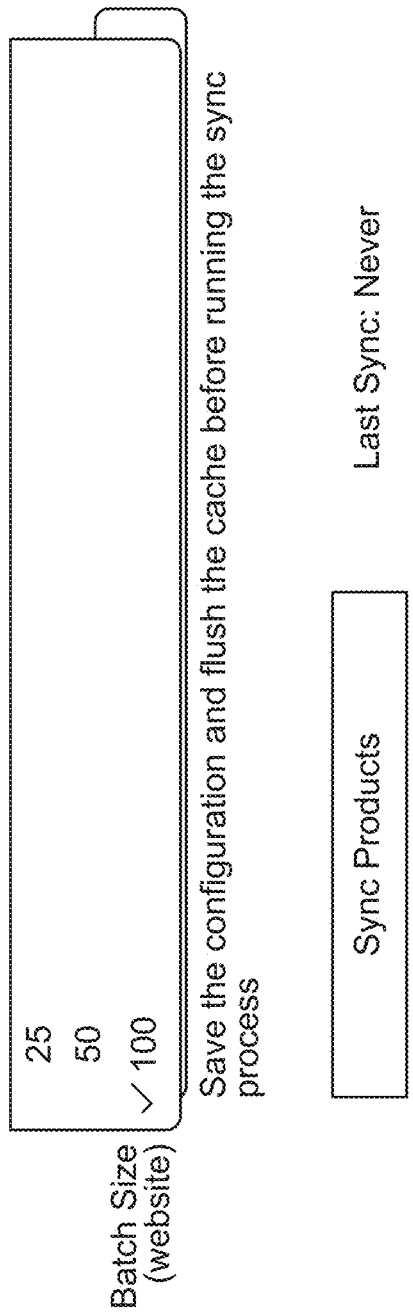
FIG. 6 illustrates an item syncing interface, in accordance with the embodiments disclosed herein.

Interface engine 208 may also be configured to receive a catalog of items. The catalog of items may include, for example, an item name, description, brand, category, image, price, reference ID, parent reference ID (allows the association of multiple product variants with a single parent product), SKU, GTIN, UPC code, ASIN, barcode. Information about the items may be received (e.g., in a file format) using an interface illustrated in FIG. 6. When the catalog of items is received, the item information may be stored in item catalog data store 230. In some examples, the items can be synchronized with item catalog data store 230 and may occur in batches of 25, 50, and 100 items.

Interface engine 208 may also be configured to provide one or more interfaces for receiving information about one or more protection plan offers. Once the information is received via the interface, the protection plan offers may be processed using protection plan engine 212. The protection plan offers may include an array of recommended protection plans comprising, for example, plan ID, plan name, plan category, price, term length, coverage type, service type (for claims), when coverage begins, deductible, a link to plan details and terms, and/or various strings of marketing text to be used in the offer. The protection plan offer information may be stored in protection plan data store 232.

Data processing engine 210 may be configured to match one or more items with one or more protection plan offers. The protection plan offer may be matched to an item when a characteristic of the protection plan offer matches an item property. In some examples, automated mapping is based primarily on product category, which is mapped to certain protection plan categories. In some examples, automated mapping is based on product title, store, or any of the product identifiers (e.g., SKU, GTIN, UPC, ASIN), and can be influenced by price (e.g., if two items are in the same product category but at different price levels, they could end up mapped to different plans).

Offer integration module 214 may be configured to provide a protection plan offer at a network document (e.g., webpage) of merchant system 120. For example, once one or more protection plan offers are identified for an item, the protection plan offers may be integrated as a frame object component of a network document (e.g., webpage) associated with merchant system 120. The frame object may link the protection plan offer to integration system 110 that is remote from merchant system 120.

Offer integration module 214 may also be configured to provide shipping options at a network document (e.g., webpage) of merchant system 120. For example, once one or more shipping options are identified for an item, the protection plan offers may be integrated as a frame object component of a network document (e.g., webpage) associated with merchant system 120. The frame object may link the shipping option to integration system 110 that is remote from merchant system 120 (e.g., shipping through a third party entity).

Figure 7:
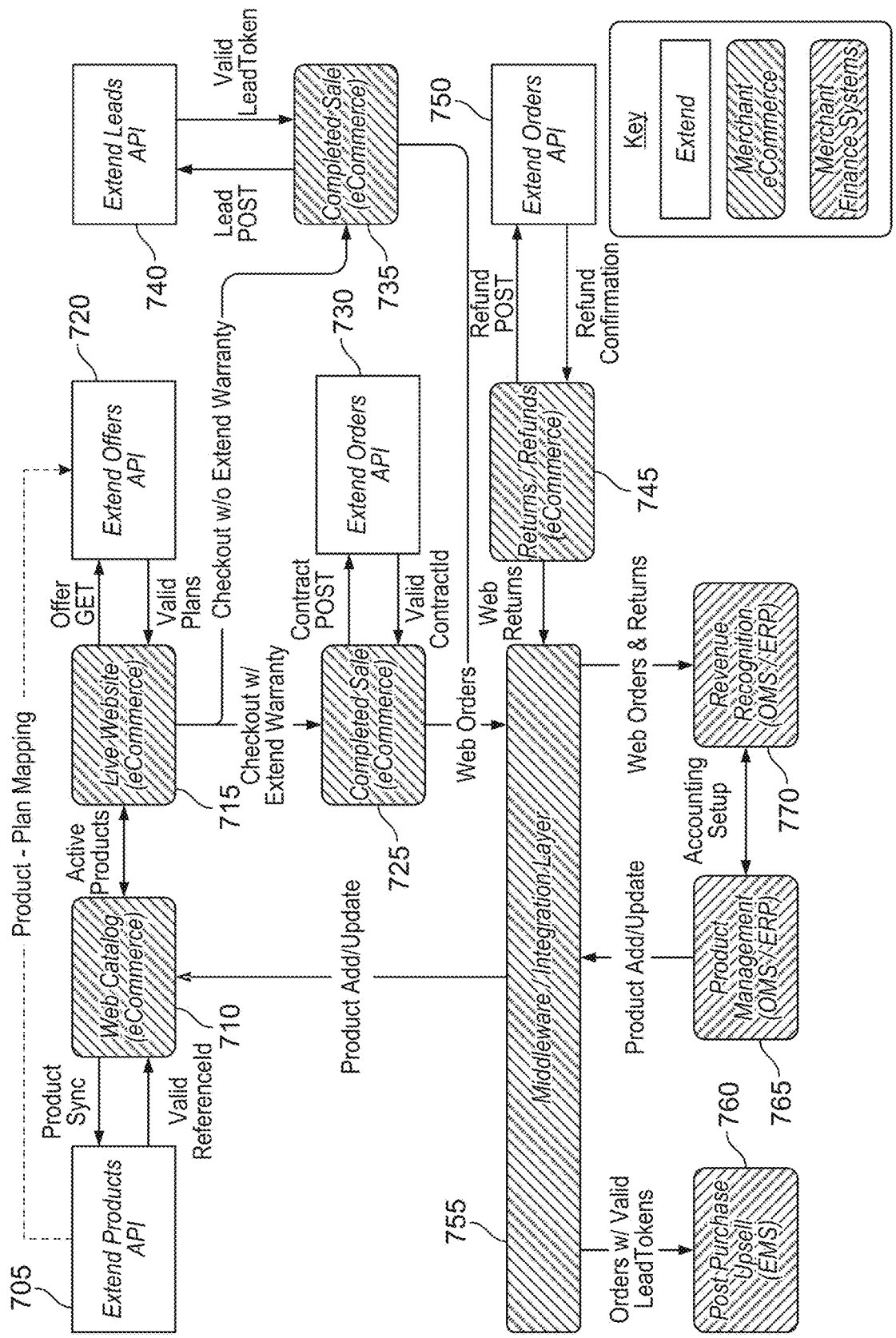
FIG. 7 illustrates an example of integrating one or more protection plan offers with merchant system, in accordance with the embodiments disclosed herein.

An illustrative example of integrating one or more protection plan or shipping offers with merchant system 120 is provided in FIG. 7. For example, merchant system 120 may integrate with different aspects of integration system 110. These integration points may be accomplished by merchant system 120 passing information directly through the APIs associated with integration system 110, or by using one or more plugins associated with integration system 110 for various eCommerce platforms (e.g., a Shopify App, Magento extension, Salesforce Commerce Cloud cartridge, BigCommerce App, or other applications).

In some examples, the plugins associated with integration system 110 may automate the API integration for merchants. As a specific example, for the step of syncing products to integration system 110, a merchant could either write code on merchant system 120 that transmits product information from their web catalog to integration system 110 via a Products API. In another example, if a merchant was on an eCommerce platform, they could install a Shopify App and that app could automatically synchronize the product information with integration system 110 on the merchant's behalf.

At block 705, item information from a merchant web catalog of merchant system 120 may be received during a synchronization process at the Products API of integration system 110. Products API of integration system 110 may validate the item information.

At block 710, integration system 110 may receive the validation referenceID.

At block 715, merchant system 120 may update the live website with the item information. The live website may transmit an offer GET command to integration system 110 via Offers API associated with integration system 110.

At block 720, integration system 110 may transmit one or more valid protection plans to the live website associated with merchant system 120.

At block 725, the live website of merchant system 120 may transmit transaction or other checkout information with the selected protection plan as a completed sale to the eCommerce platform. In this example, the protection plan is selected by the user.

At block 730, the eCommerce platform may transmit a contract POST command to integration system 110 via an Orders API or a Contracts API associated with integration system 110. The Orders API may enable merchants to report various actions related to a transaction including orders, whether product protection or shipping protection was purchased, whether a product was returned, etc. Integration system 110 may then process this information to create a contract (e.g., an extended product protection contract if extended product protection was purchased, a shipping protection contract if a purchased product is shipping and/or shipping protection was purchased), a lead, a refund, etc. A valid contractID may be transmitted back to the eCommerce platform.

At block 735, the live website of merchant system 120 may transmit transaction or other checkout information without any selected protection plan as a completed sale to the eCommerce platform. In this example, the protection plan is not selected by the user.

At block 740, the eCommerce platform may transmit a lead POST command to integration system 110 via Leads API associated with integration system 110. A valid lead token may be transmitted back to the eCommerce platform.

At block 745, the eCommerce platform may transmit a refund POST command to integration system 110 via Contracts API associated with integration system 110. A refund confirmation may be transmitted back to the eCommerce platform.

At block 750, the eCommerce platform of merchant system 120 may receive the refund confirmation of the returned item via the Orders API or a Contracts API.

At block 755, a middleware integration layer of merchant system 120 may transmit item information one or more items added to the web catalog, returned to the merchant, or removed from the web catalog. For example, the item information may be added when the item is received at a merchant warehouse associated with merchant system 120 (e.g., from a manufacturer or returned by a consumer). In another example, the item information may be removed when the item is ordered through the eCommerce platform of merchant system 120.

At block 760, a post purchase upsell component of merchant system 120 may receive an order with a valid lead token from the middleware integration layer of merchant system 120.

At block 765, an item may be added or updated. For example, the merchant finance system of merchant system 120 (e.g., which may be separate from the eCommerce platform) may interact with the middleware integration layer of merchant system 120.

At block 770, an item may be removed after a web order or a return. For example, the merchant finance system of merchant system 120 may interact with the middleware integration layer of merchant system 120.

Figure 8:
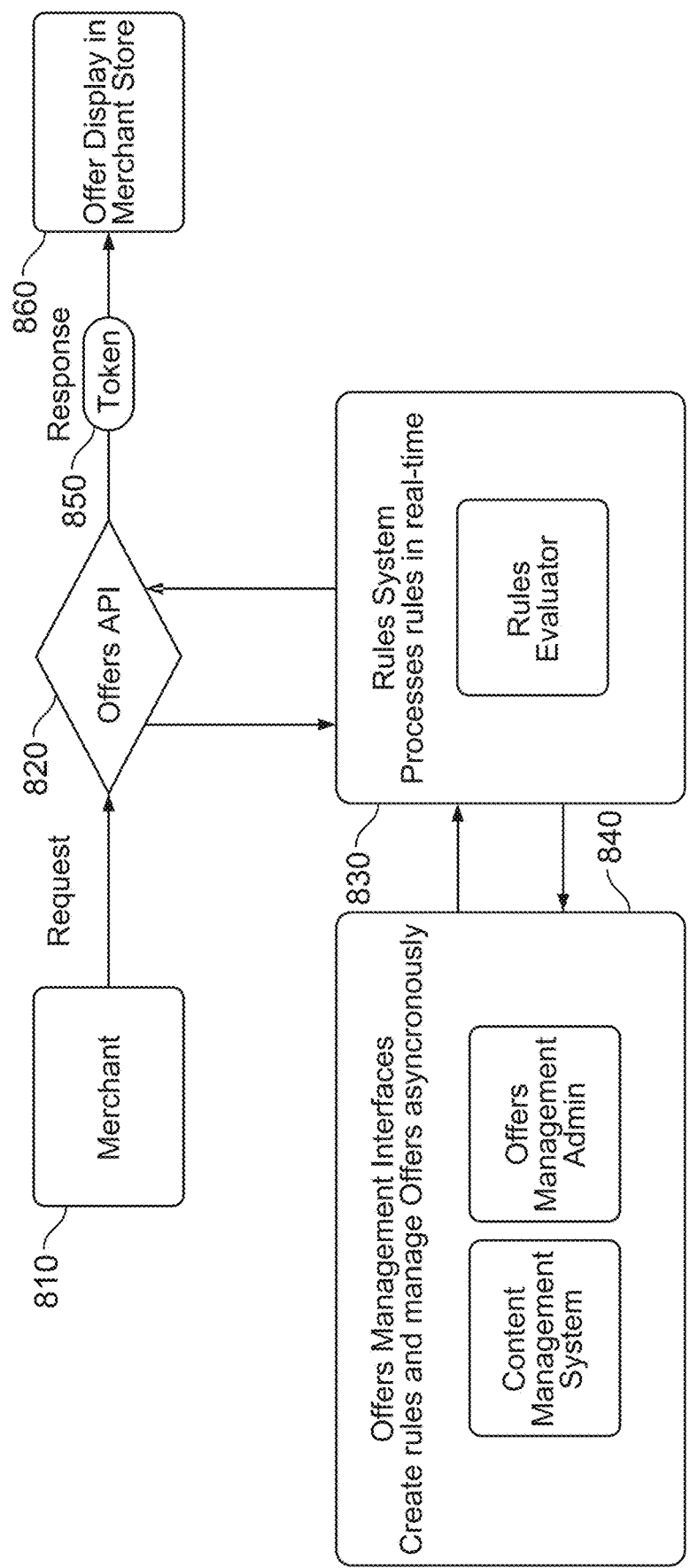
FIG. 8 illustrates an example of integrating one or more protection plan offers with merchant system, in accordance with the embodiments disclosed herein.

An illustrative example of integrating one or more protection plan offers with merchant system 120 is provided in FIG. 8. For example, merchant system 120 may dynamically deliver an optimized protection plan offer to the merchant and then to the customer.

At block 810, the live website of merchant system 120 may transmit a GET command to integration system 110 via Offers API associated with integration system 110.

At block 820, the Offers API associated with integration system 110 may transmit token 850 to live website of merchant system 120. Integration system 110 may determine one or more protection plan offers for display at the live website with the item.

Prior to transmitting token 850, Offers API associated with integration system 110 may determine one or more offers associated with the token. For example, at block 830, Offers API may interact with rules system associated with integration system 110 to determine one or more rules that identify one or more offers.

At block 840, the rules system associated with integration system 110 may interact with offers management interfaces associated with integration system 110. The offers management interfaces may be used to create or alter one or more rules that associated with the protection plan offers. The creation and management of these rules may be implemented asynchronously and not related to an order, return, or other transaction.

At block 860, the protection plan offer associated with token 850 may be displayed at the live website of merchant system 120 with the item.

Chatbot module 216 may be configured to provide questions and/or responses at a network document (e.g., webpage) associated with merchant system 120. The chatbot receives questions and provides answers corresponding with a pre-determined decision tree of questions and inputs based on protection plans, merchant information, and product information. For example, the chatbot may assist a consumer user by answering questions or providing information about one or more protection plan offers for an item. In another example, the chatbot may configure different question and response paths for adjudicating claims for the consumer user, an internal claims administrative user (e.g., for customer service agents taking claims via phone), or merchant claims administration tool.

In an illustrative example, the chatbot may receive a customer's email address and identification of a product they are filing a claim about, or alternatively, the customer may enter information associated with the protection plan (e.g., contract ID or merchant order ID). Chatbot module 216 may identify the customer and the protection plan about which the customer is filing a claim using the provided information. Once the protection plan contract is identified, chatbot module 216 can look up the correct decision tree to use. The decision trees may be generally associated with a protection plan, but there can be decision tree branches that are specific to a merchant or product category. Chatbot module 216 then walks the customer through a series of questions and customer inputs based on the selected decision tree, and the customer's path through that decision tree differ based on customer inputs. For example, in a furniture claim, one question in the decision tree may be whether the damage is a tear or a stain, and if the customer selects "stain" then the next question will be about the type of stain.

Contract management engine 218 may be configured to customize text in protection plan offers, shipping options, and information pages at the network document. The information may provide descriptions of items or merchants, item categories, or other relevant information about protection plan offers for consumer users. The contract management engine can provide text manually by an administrative user and/or automatically provide the information when a protection plan offer is displayed in different merchant stores.

Lead token engine 220 may be configured to determine one or more lead tokens. A lead token may correspond with an item that was purchased without a corresponding protection plan offer. The lead token may identify a consumer user to contact after a purchase of the item to follow up with another offer to acquire the protection plan.

Administration module 222 may be configured to provide information for administrative and merchant users. For example, a merchant customer service agent can log into an interface of the integration system and be walked through an online form that teaches the agent how to determine information generate a claim. The interface may dynamically display a correct question and response flow for a particular merchant or protection plan (e.g., based on a decision tree).

Administration module 222 (e.g., with data processing engine 210) may be configured to real-time automated mapping between a protection plan offer and an item (or one or more shipping options and an item). For example, administration module 222 may have the ability to map an item not previously stored in an item catalog data store and map the item to a protection plan offer in real-time. The mapping may be based on item category information and/or a trained ML model involving other item data.

Action module 224 may be configured to provide one or more services (e.g., using order data, protection plan offer information, or consumer user information). For example, action module 224 may initiate support for merchants by implementing one or more actions. Examples of actions may include, for example, creating a protection plan based on an purchased protection plan offer, create a lead token associated with a potential future consumer (e.g., using lead token engine 220), create items with corresponding information, cancel or update protection plan offers, initialize a refund process, update protection plan coverage dates based on delayed shipping timelines from the order date, generate a shipping protection order, and initiate original equipment manufacturer (OEM) protection plan services, returns management, or other post-purchase services. The actions may be stored with action log data store 234.

Action module 224 may be configured to select one or more actions automatically. For example, the actions may be chosen automatically based on predefined rules associated with the contents of the order information passed to integration system 110.

In an illustrative example, if the order information includes a product and an associated protection plan, a rule stored with integration system 110 (e.g., in protection plan data store 232 or action log data store 234) may match the combination of product and protection plan. Action module 224 can create a product protection or shipping protection contract for that customer and product. If, on the other hand, the order information included a product that can be protected through a protection plan but no protection plan was selected, a rule stored with integration system 110 may create a lead token instead (e.g., via lead token engine 220).

Figure 9:
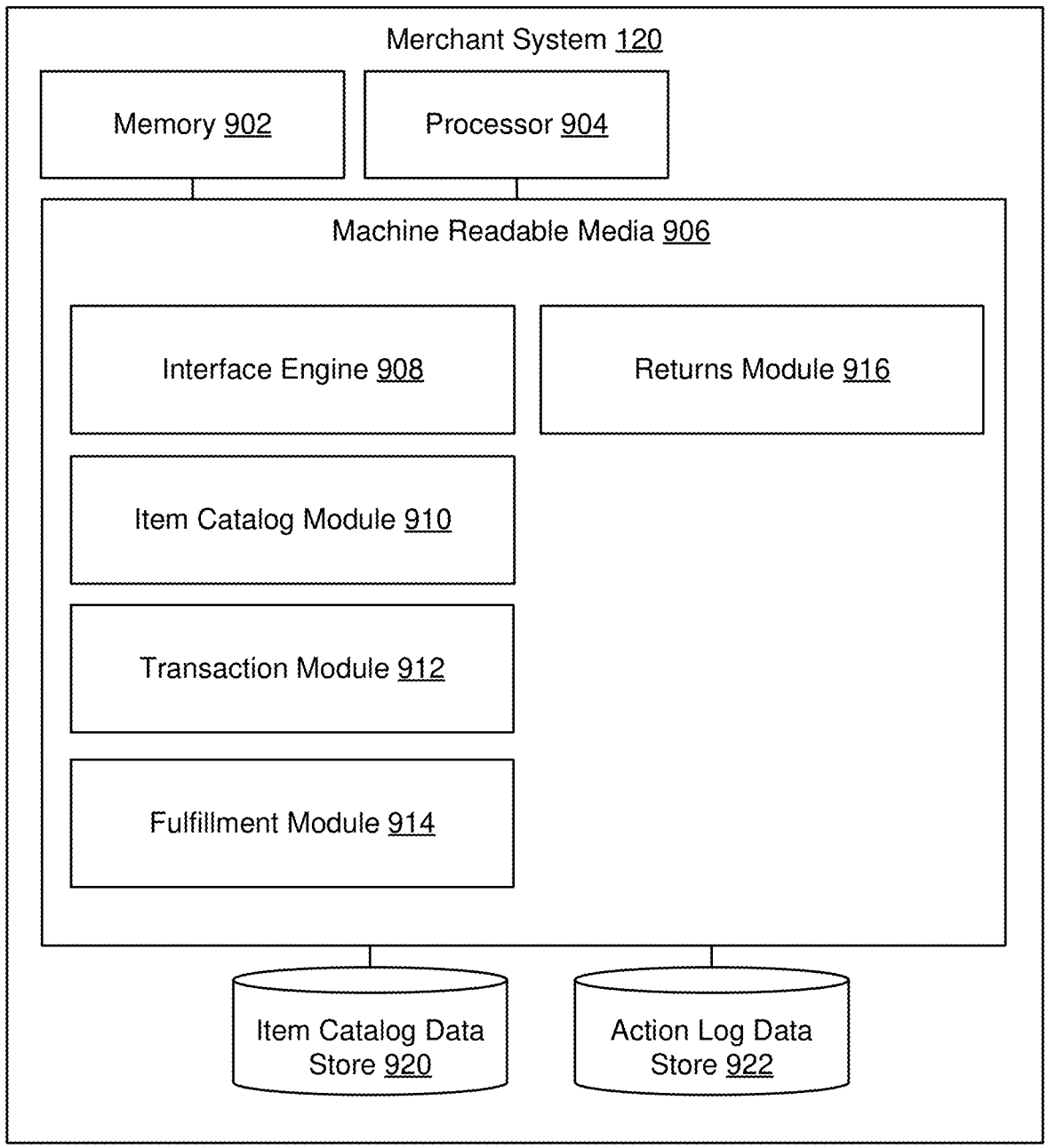
FIG. 9 illustrates a merchant system, in accordance with the embodiments disclosed herein.

FIG. 9 illustrates a merchant system, in accordance with the embodiments disclosed herein. As illustrated, merchant system 120 may comprise, for example, memory 902, processor 904, machine readable media 906, and one or more data stores, including item catalog data store 920 and action log data store 922.

Memory 902 may comprise random-access memory ("RAM") or other dynamic memory for storing information and instructions to be executed by processor 904. Memory 902 might also be used for storing temporary variables or other intermediate information during execution of instructions to be executed by processor 904. Memory 902 may also comprise a read only memory ("ROM") or other static storage device coupled to a bus for storing static information and instructions for processor 904.

Processor 904 may comprise a general-purpose or special-purpose processing engine such as, for example, a microprocessor, controller, or other control logic. Processor 904 may be connected to a bus, although any communication medium can be used to facilitate interaction with other components of merchant system 120 or to communicate externally.

Machine readable media 906 may comprise one or more interfaces, circuits, and modules for implementing the functionality discussed herein. Machine readable media 906 may carrying one or more sequences of one or more instructions processor 904 for execution. Such instructions embodied on machine readable media 906 may enable merchant system 120 to perform features or functions of the disclosed technology as discussed herein. For example, the interfaces, circuits, and modules of machine readable media 906 may comprise, for example, interface engine 908, item catalog module 910, transaction module 912, fulfillment module 914, and returns module 916.

Interface engine 908 may be configured to provide a network document associated with merchant system 120 to a browser application of consumer device 130. For example, the network document may include an electronic storefront to purchase items provided by merchant system 120. Consumer device 130 may access the network document via network 140.

Figure 10:
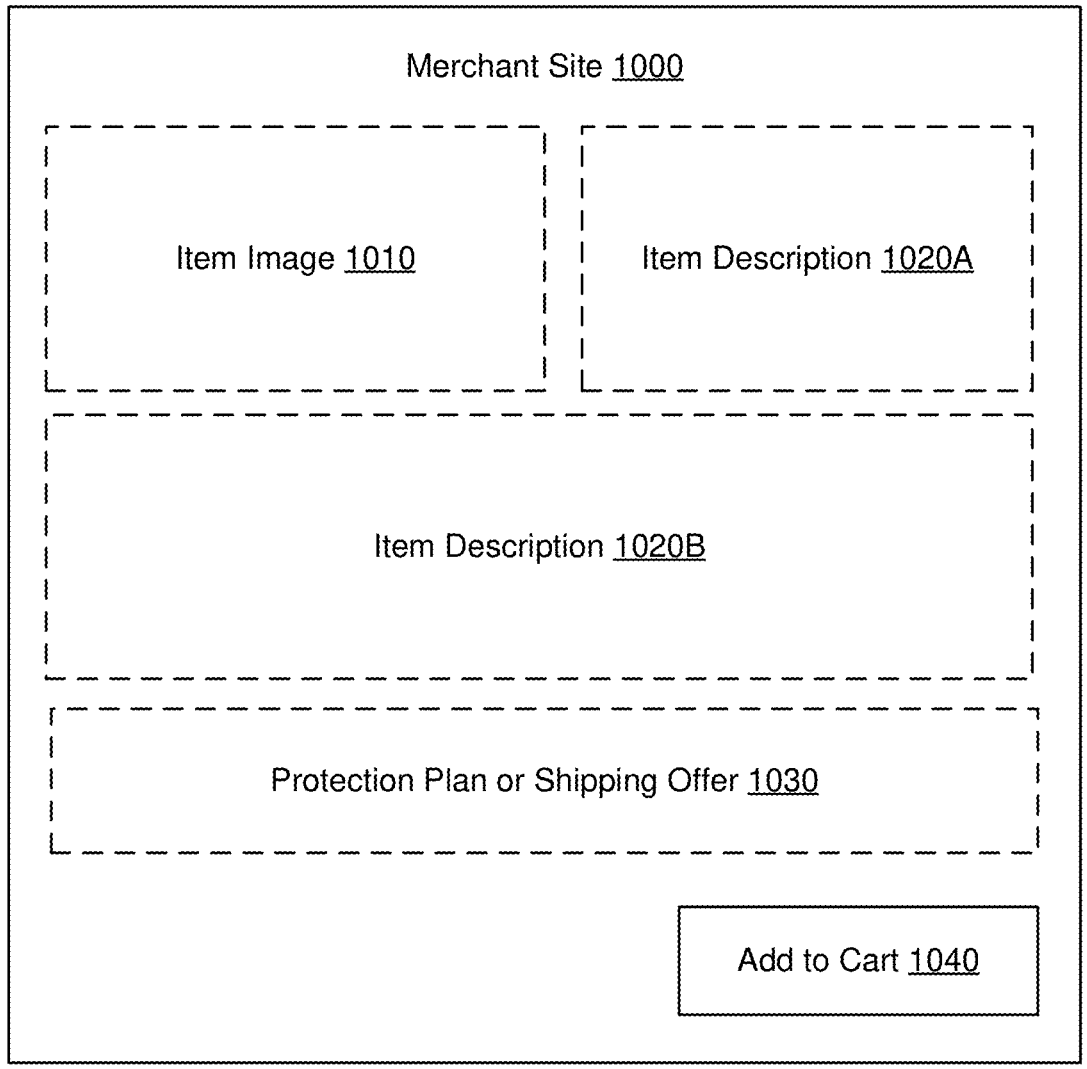
FIG. 10 illustrates a layout of a network document associated with a merchant system, in accordance with the embodiments disclosed herein.

An illustrative layout of a network document associated with merchant system 120 is provided with FIG. 10. In this example, merchant site 1000 includes item image 1010, one or more item descriptions 1020 (illustrated as first item description 1020A and second item description 1020B), protection plan or shipping offer 1030, and "add to cart" tool 1040. Protection plan or shipping offer 1030 may be a frame object that is replaceable and updated by integration system 110.

Figure 11:
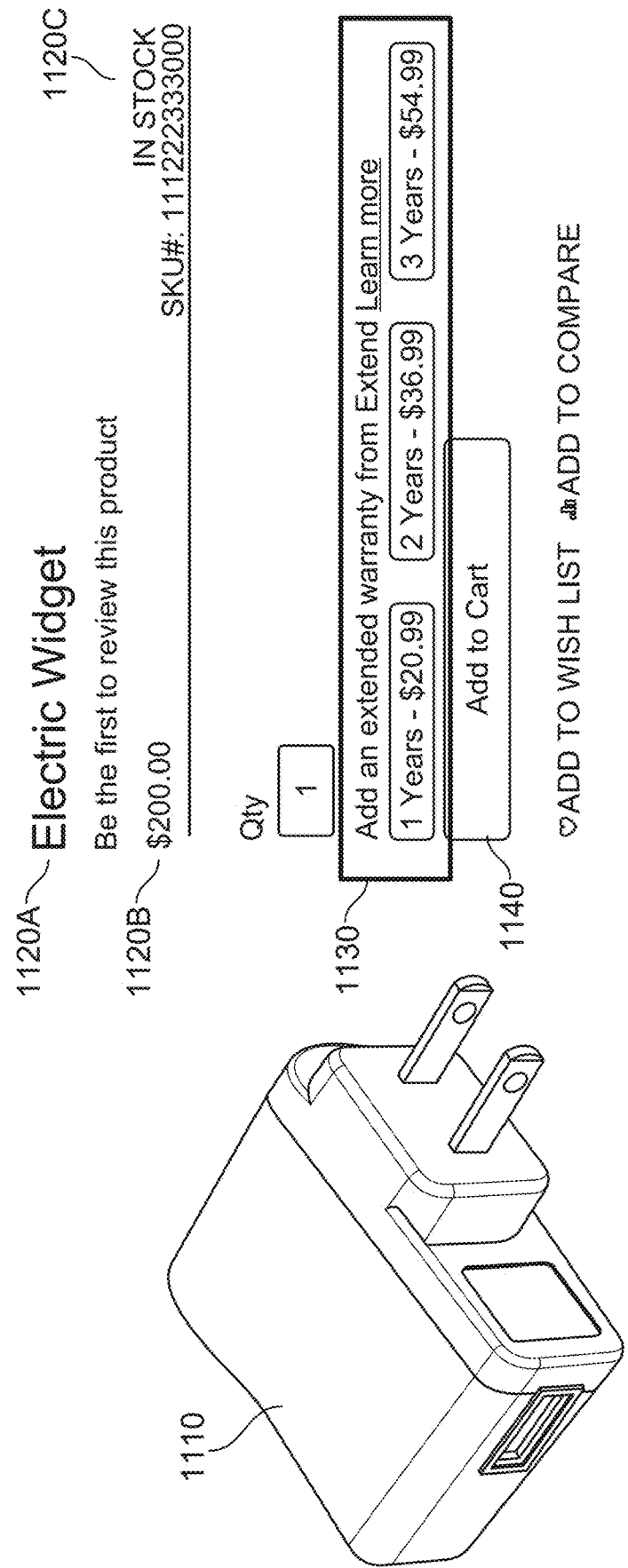
FIG. 11 illustrates an example of a network document associated with a merchant system, in accordance with the embodiments disclosed herein.

An illustrative example of a network document associated with merchant system 120 is provided with FIG. 11. In this example, merchant site 1100 includes item image 1110, one or more item descriptions 1120 (illustrated as first item description 1120A, second item description 1120B, and third item description 1120C), protection plan or shipping offer 1130, and "add to cart" tool 1140.

For example, once the installation steps are completed by the merchant user, one or more protection plans or shipping offers may be provided in a frame object for display at 1130. In some examples, the merchant may be authenticated and identify a catalog of items offered by merchant system 120. The items may be synced with integration system 110 and associated with one or more protection plans or shipping offers. The available protection plans or shipping offers may be displayed in the storefront at 1130. The network document may correspond with Product Detail Page, Interstitial Modal, and the Shopping Cart. The protection plans and/or shipping offers may be shown above the "add to cart" tool 1140.

Figure 12:
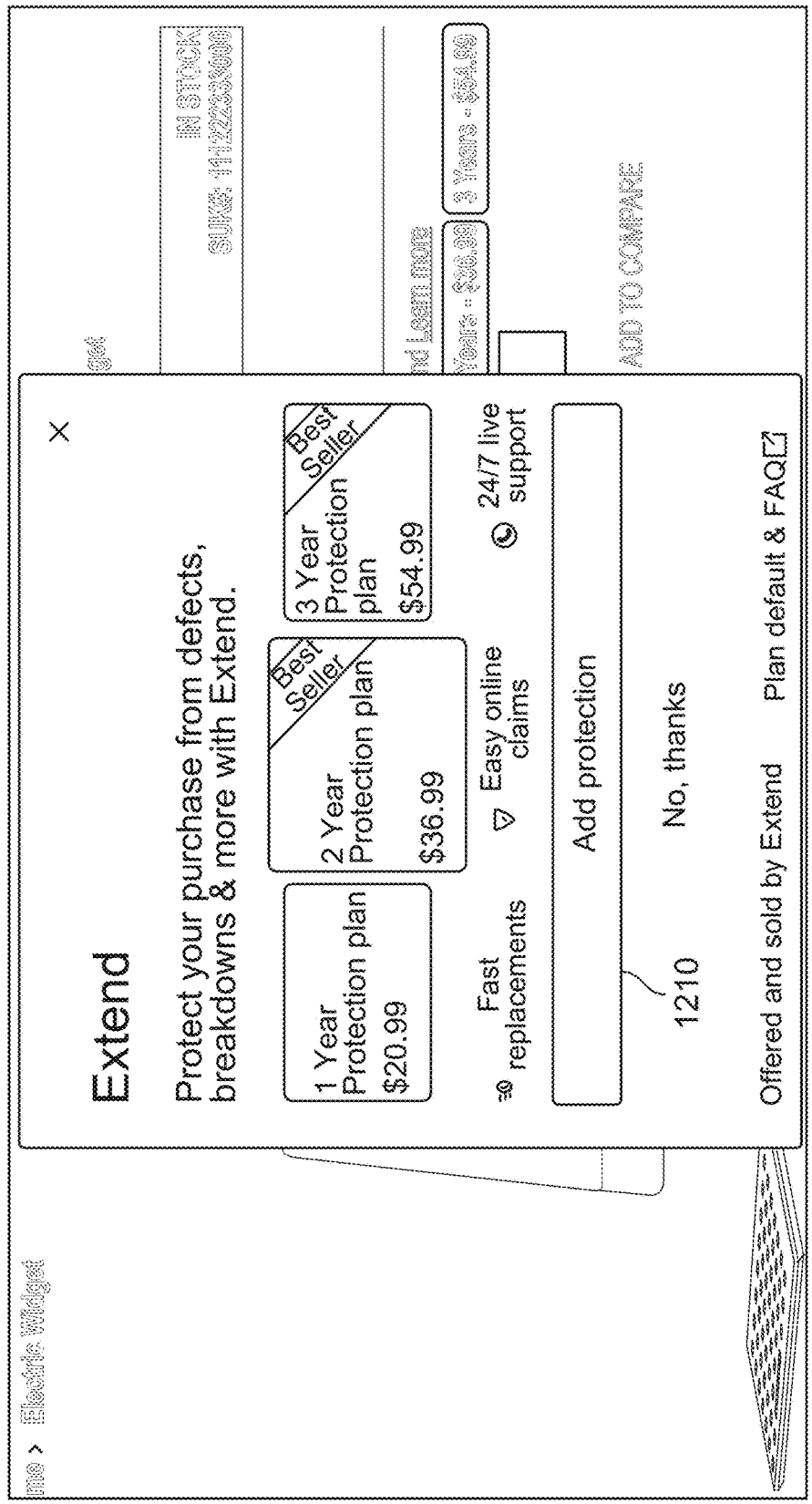
FIG. 12 illustrates an example of a network document associated with a merchant system, in accordance with the embodiments disclosed herein.

An illustrative example of a network document associated with merchant system 120 is also provided with FIG. 12. In this example, merchant site 1200 includes a plurality of protection plan offers for the item illustrated in FIG. 11. Shipping options may also or alternatively be provided.

For example, the network document may identify whether a protection plan offer was selected. Using a tool (e.g., provided by integration system 110) incorporated with the merchant website, the website may display the protection plan offer when the corresponding item is displayed. An indication of whether the protection plan offer was selected or not selected may be determined. When selecting the "add to cart" tool 1140, if no protection plan offer is selected, the consumer user may see a modal window displaying the linked protection plan offers to the item they have added. Selecting the "add protection" tool 1210 may add a protection plan offer to the electronic shopping cart in addition to the item.

In some examples, an API call is activated to send analytics back to integration system 110 to let the system know whether or not a user saw the protection plan offers. In some examples, the Interstitial Modal (e.g., displaying the protection plan offers) may be provided whenever the Product Detail Page or the Shopping Cart is displayed. The protection plan offers may be pre-fetched when the user first loads the page, so no additional network request may be needed.

Figure 13:
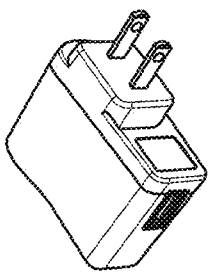
FIG. 13 illustrates an example of a network document associated with a merchant system, in accordance with the embodiments disclosed herein.

An illustrative example of a network document associated with merchant system 120 is also provided with FIG. 13. In this example, the "add to cart" tool 1140 for the item illustrated in FIG. 11 was activated and the item was added to the electronic shopping cart without the protection plan offer. A second opportunity to add a protection plan offer may be provided with FIG. 13 at the "add protection" tool 1310. If selected, merchant system 120 may add a protection plan offer to the electronic shopping cart in addition to the item.

Figure 14:
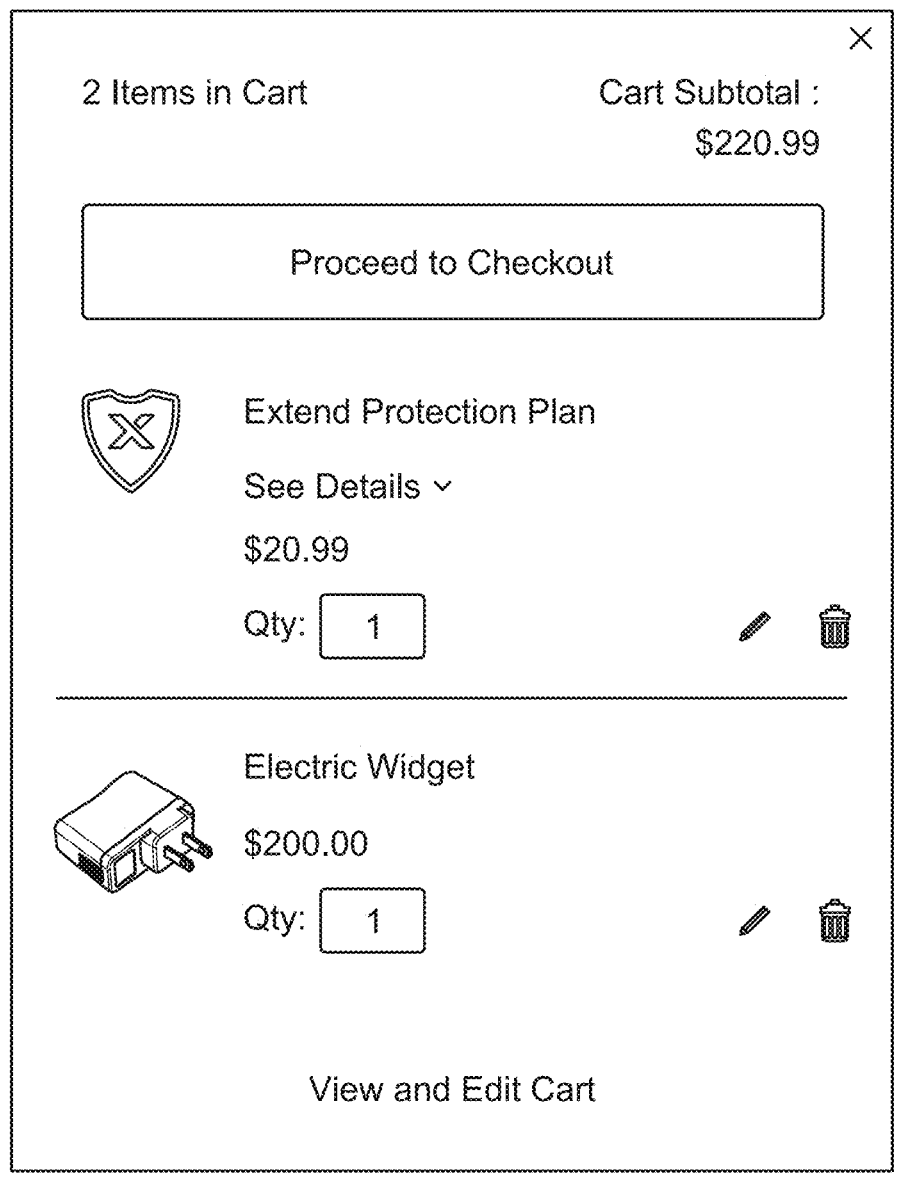
FIG. 14 illustrates an example of a network document associated with a merchant system, in accordance with the embodiments disclosed herein.

An illustrative example of a network document associated with merchant system 120 is also provided with FIG. 14. In this example, an electric shopping cart is illustrated for the item illustrated in FIG. 11. For example, a protection plan offer and an item associated with merchant user may be added to the electronic shopping cart.

In some examples, the protection plan offer may be manually added to an order with an item, as illustrated in FIG. 15. In this example, an item may be added to an electronic shopping cart without a protection plan offer. The protection plan offer may be added using the "add protection" tool 1510 after the item is added to the electronic shopping cart.

Item catalog module 910 may be configured to provide information associated with an item. For example, the information may comprise an item name, description, brand, category, image, price, reference ID, parent reference ID (e.g., in order to associate multiple product variants with a single parent product), SKU, GTIN, UPC code, ASIN, and/or barcode. The item information may be provided and/or synced with integration system 110 to identify one or more protection plan offers associated with the item. The item may be offered for purchase by the merchant at the network document. The item information may be stored in item catalog data store 920.

Transaction module 912 may be configured to initiate a transaction process for an item. Once "add to cart" tool is activated for a particular item, the transaction process may be initiated for the item locally at the merchant system 120 to provide the item to the consumer user.

Figure 16:
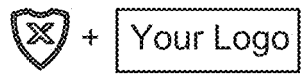
FIG. 16 illustrates information provided in association with a transaction process, in accordance with the embodiments disclosed herein.

FIG. 16 illustrates information provided in association with a transaction process, in accordance with the embodiments disclosed herein. For example, once the transaction has completed, a contract ID 1610 may be provided in association with the item and the protection plan offer. The contract ID 1610 may be provided at the network document or provided through an electronic communication system.

Fulfillment module 914 may be configured to initiate a process to provide the item to the consumer user. For example, item fulfilment may be a process consisting of receiving a physical item and shipping the item for distribution to the consumer user.

Returns module 916 may be configured to initiate a return process to return the item from the consumer user back to the merchant. For example, the process may comprise identifying that the item was received from the consumer user at a shipping facility, updating a data store that the item was received (e.g., and available for a new transaction), and returning any funds transferred back to an account of the consumer user.

An illustrative interface for initiating the return process is provided with FIG. 17. For example, the consumer user may select the item or protection plan offer to return and select the "request refund" tool 1710.

Figure 18:
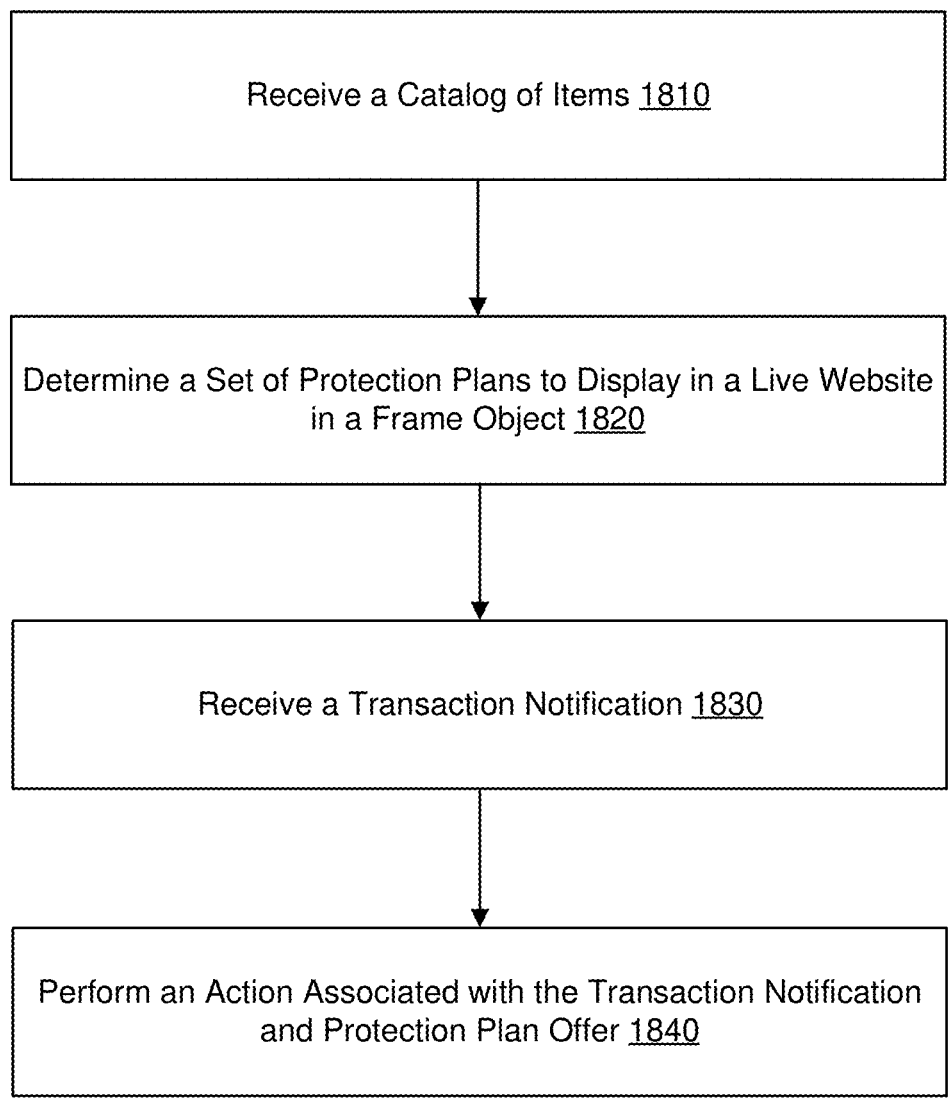
FIG. 18 illustrates a process for implementing an integration system, in accordance with the embodiments disclosed herein.

FIG. 18 illustrates a process for implementing an integration system, in accordance with the embodiments disclosed herein. In some examples, integration system 110 of FIG. 1 or other computing device may perform the process illustrated in FIG. 18.

At block 1810, the process may receive a catalog of items from a merchant. In certain embodiments, interface engine 208 of integration system 110 may receive the catalog of items.

At block 1820, the process may determine a set of protection plan offers to display in a live website associated with the merchant. In certain embodiments, data processing engine 210 and/or protection plan engine 212 of integration system 110 may determine the set of protection plan offers to display in the live website.

The live website may display items of the catalog of items with frame objects comprising the set of protection plan offers. In some embodiments, at least one of protection plan engine 212 and offer integration module 214 of integration system 110 may display the items of the catalog of items with the frame objects comprising the set of protection plan offers.

At block 1830, the process may receive a notification associated with a transaction involving a first item of the catalog of items and a customer. In certain embodiments, interface engine 208 of integration system 110 may receive the notification associated with the transaction.

Figure 19:
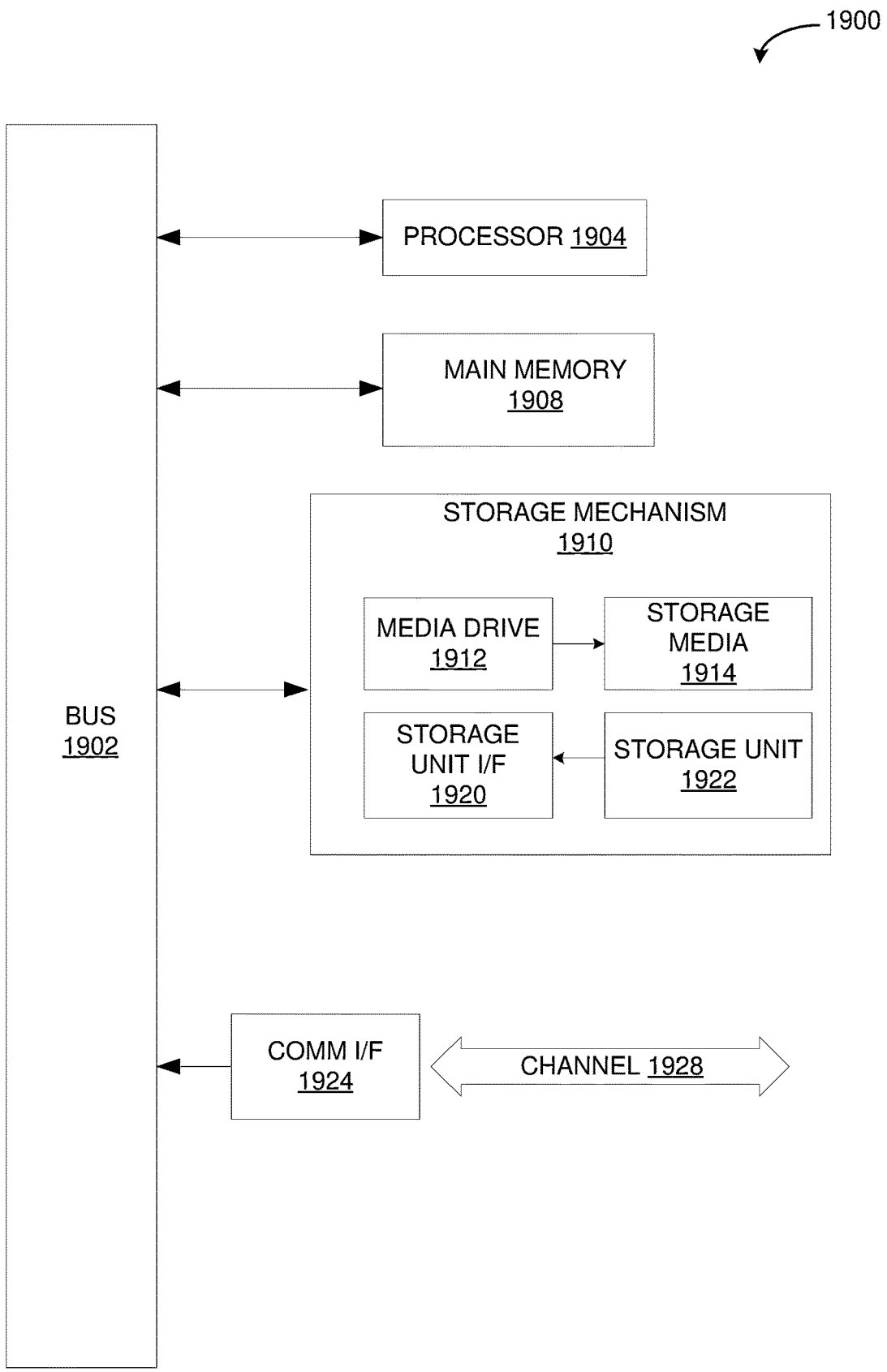
FIG. 19 is an example of a computing system that may be used in implementing various features of embodiments of the disclosed technology.

At block 1840, the process may perform an action associated with the transaction notification and a first protection plan offer of the set of protection plan offers. In certain embodiments, action module 224 of integration system 110 may perform the action associated with the transaction notification and the first protection plan offer.

Where the transaction includes purchase of a first protection plan associated with the first protection plan offer, the process may for example: (a) create a contract (e.g., a product protection contract or a shipping protection contract) associated with the first item, the customer, and the first protection plan offer (e.g., a contract for a first protection plan associated with the first protection plan offer); or (b) generate a refund associated with the first item, the customer, and the first protection plan offer (e.g., a refund for the first item under a first protection plan associated with the first protection plan offer).

Where the transaction does not include purchase of a protection plan associated with the first protection plan offer, the process may generate a lead token associated with the first item, the customer, and the first protection plan offer. Accordingly leveraging the lead token, the first protection plan offer can be re-marketed to the customer at a later time.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 19. Various embodiments are described in terms of this example logical circuit 1900. After reading this description, it will become apparent to a person skilled in the relevant art how to implement the technology using other logical circuits or architectures.

Referring now to FIG. 19, computing system 1900 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 1900 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1900 might include, for example, one or more processors, controllers, control engines, or other processing devices, such as a processor 1904. Processor 1904 might be implemented using a general-purpose or special-purpose processing engine such as, for example, a microprocessor, controller, or other control logic. In the illustrated example, processor 1904 is connected to a bus 1902, although any communication medium can be used to facilitate interaction with other components of logical circuit 2100 or to communicate externally.

Computing system 1900 might also include one or more memory engines, simply referred to herein as main memory 1908. For example, preferably random-access memory ("RAM") or other dynamic memory, might be used for storing information and instructions to be executed by processor 1904. Main memory 1908 might also be used for storing temporary variables or other intermediate information during execution of instructions to be executed by processor 1904. Logical circuit 1900 might likewise include a read only memory ("ROM") or other static storage device coupled to bus 1902 for storing static information and instructions for processor 1904.

The computing system 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive might be provided. Accordingly, storage media 1914 might include, for example, a hard disk, a floppy disk, magnetic tape, cartridge, optical disk, a CD or DVD, or other fixed or removable medium that is read by, written to, or accessed by media drive 1912. As these examples illustrate, the storage media 1914 can include a computer usable storage medium having stored therein computer software or data.

In alternative embodiments, information storage mechanism 1940 might include other similar instrumentalities for allowing computer programs or other instructions or data to be loaded into logical circuit 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory engine) and memory slot, a PCMCIA slot and card, and other fixed or removable storage units 1922 and interfaces 1920 that allow software and data to be transferred from the storage unit 1922 to logical circuit 1900.

Logical circuit 1900 might also include a communications interface 1924. Communications interface 1924 might be used to allow software and data to be transferred between logical circuit 1900 and external devices. Examples of communications interface 1924 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1908, storage unit 1920, media 1914, and channel 1928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1900 to perform features or functions of the disclosed technology as discussed herein.

Although FIG. 19 depicts a computer network, it is understood that the disclosure is not limited to operation with a computer network, but rather, the disclosure may be practiced in any suitable electronic device. Accordingly, the computer network depicted in FIG. 19 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for product mapping using one or more processors of an integration platform facilitating determination and presentation of a set of protection plan offers related to an item offered by a merchant, selection of a protection plan by a consumer, and lifecycle management of the protection plan by posing questions to the consumer and processing a claim for repair or replacement of the item associated with the protection plan, the one or more processors programmed with computer instructions which when executed by the one or more processors cause the integration platform to:
receive, using an interface engine of the integration platform, a catalog of items from the merchant, wherein the catalog of items includes the item;
dynamically matching, using a product catalog mapping engine of the integration platform, the set of protection plan offers with a set of items of the catalog of items from the merchant,
wherein the set of protection plan offers are displayed, by the interface engine of the integration platform, in a live website associated with the merchant;
in response to determining that the customer has selected an interactive interface object on the live website to: add the item to a virtual shopping cart or to process a transaction involving the item from the virtual shopping cart, overlaying a modal window over the live website, wherein the modal window displays a subset of the set of protection plan offers that are mapped to the item and are selectable via a second interactive interface object displayed in the modal window;
receive a notification related to the transaction involving the item, the protection plan, and the customer;
processing the transaction of the item, by an orders application programming interface (API) or a contracts API of the integration platform, to create a service contract associated with the protection plan, the protection plan corresponding to pricing of the item and a time period of the protection plan;
creating a data structure including a product reference identifier and a protection plan identifier associated with the service contract and automatically registering the protection plan on behalf of the customer; and
providing the product reference identifier and the protection plan identifier, by the orders API or the contracts API of the integration platform, to perform an action associated with the transaction.

2. The computer-implemented method of claim 1, further comprising:
receiving, by the interface engine of the integration platform, the catalog of items and the notification related to the transaction;
determining, by a data processing engine of the integration platform, the set of protection plan offers to display in the live website; and
performing, by the integration platform, the action associated with the transaction and the protection plan.

3. The computer-implemented method of claim 1, wherein the computer instructions which when executed by the one or more processors further cause the integration platform to:
provide an offers management system that includes a set of connected platforms to manage aspects of the set of protection plan offers.

4. The computer-implemented method of claim 3, wherein the offers management system includes an offers management administrative module, a rules system, an offers API, a content management system, lead tokens, and an offer rendering.

5. The computer-implemented method of claim 1, wherein the set of protection plan offers are chosen according to rules based on at least one of offer price, merchant, product type, term length, coverage type, service type, region, and subregion.

6. The computer-implemented method of claim 1, wherein the set of protection plan offers are provided natively at the live website associated with the merchant.

7. The computer-implemented method of claim 1, wherein the transaction includes purchase of the protection plan, and performing the action associated with the transaction and the protection plan comprises:
generating the service contract associated with the item, the customer, and the protection plan.

8. The computer-implemented method of claim 1, wherein the transaction includes purchase of the protection plan, and performing the action associated with the transaction and the protection plan comprises:
generating a refund associated with the item, the customer, and the protection plan.

9. The computer-implemented method of claim 1, wherein the transaction does not include purchase of the protection plan, and performing the action associated with the transaction and the protection plan comprises:
generating a lead token associated with the item, the customer, and the protection plan.

10. An integration system facilitating determination and presentation of a set of protection plan offers related to an item offered by a merchant, selection of a protection plan by a consumer, and lifecycle management of the protection plan by posing questions to the consumer and processing a claim for repair or replacement of the item associated with the protection plan, the integration system comprising:
one or more processors; and
a memory operatively connected to the one or more processors, and including computer code that when executed, causes the integration system to perform a method comprising:
receiving, using an interface engine of the integration system, a catalog of items from a merchant, wherein the catalog of items includes the item;
dynamically matching, using a product catalog mapping engine of the integration system, the set of protection plan offers with a set of items of the catalog of items from the merchant,
wherein the set of protection plan offers are displayed, by the interface engine of the integration platform, in a live website associated with the merchant;
in response to determining that the customer has selected an interactive interface object on the live website to: add the item to a virtual shopping cart or to process a transaction involving the item from the virtual shopping cart, overlaying a modal window over the live website, wherein the modal window displays a subset of the set of protection plan offers that are mapped to the item and are selectable via a second interactive interface object displayed in the modal window;

receiving a notification associated with the transaction involving the item, the protection plan, and the customer;

processing the transaction of the item, by an orders application programming interface (API) or a contracts API of the integration system, to create a service contract associated with the protection plan, the protection plan corresponding to pricing of the item and a time period of the protection plan;

creating a data structure including a product reference identifier and a protection plan identifier associated with the service contract and automatically registering the protection plan on behalf of the customer; and providing the product reference identifier and the protection plan identifier, by the orders API or the contracts API of the integration system, to perform an action associated with the transaction.

11. The integration system of claim 10, wherein the computer code causes the integration system to perform the method further comprising:

receiving the catalog of items and the notification associated with the transaction;

determining the set of protection plan offers to display in the live website; and performing the action associated with the transaction and the protection plan.

12. The integration system of claim 10, wherein the computer code causes the integration system to perform the method further comprising:

providing an offers management system that includes a set of connected platforms to manage aspects of the set of protection plan offers.

13. The integration system of claim 12, wherein the offers management system includes an offers management administrative module, a rules system, an offers API, a content management system, lead tokens, and an offer rendering.

14. The integration system of claim 10, wherein the set of protection plan offers are chosen according to rules based on at least one of offer price, merchant, product type, term length, coverage type, service type, region, and subregion.

15. The integration system of claim 10, wherein the set of protection plan offers are provided natively at the live website associated with the merchant.

16. The integration system of claim 10, wherein the transaction includes purchase of the protection plan protection, and the method further comprises:

generating the service contract associated with the item, the customer, and the protection plan.

17. The integration system of claim 10, wherein the transaction includes purchase of the protection plan, and the method further comprises:

generating a refund associated with the item, the customer, and the protection plan.

18. The integration system of claim 10, wherein the computer code causes the integration system to perform the method further comprising:

generating a lead token associated with the item, the customer, and the set of protection plan offers.

19. A non-transitory computer-readable medium storing instructions, which when executed by one or more processing resources of an integration platform facilitating determination and presentation of a set of protection plan offers related to an item offered by a merchant, selection of a protection plan by a consumer, and lifecycle management of the protection plan by posing questions to the consumer and processing a claim for repair or replacement of the item associated with the protection plan, cause the one or more processing resources to perform a method comprising:

receiving, at the integration platform, a catalog of items from the merchant, wherein the catalog of items includes the item;

dynamically matching, by the integration platform, the set of protection plan offers with a set of items of the catalog of items from the merchant, wherein the set of protection plan offers are displayed, by an interface engine of the integration platform, in a live website associated with the merchant;

in response to determining that the customer has selected an interactive interface object on the live website to: add the item to a virtual shopping cart or to process a transaction involving the item from the virtual shopping cart, overlaying a modal window over the live website, wherein the modal window displays a subset of the set of protection plan offers that are mapped to the item and are selectable via a second interactive interface object displayed in the modal window;

receiving, at the integration platform, a notification associated with the transaction involving the item, the protection plan, and the customer;

processing the transaction of the item to create a service contract associated with the protection plan, the protection plan corresponding to pricing of the item and a time period of the protection plan;

creating a data structure including a product reference identifier and a protection plan identifier associated with the service contract and automatically registering the protection plan on behalf of the customer; and providing the product reference identifier and the protection plan identifier to perform, by the integration platform, an action associated with the transaction.

20. The non-transitory computer-readable medium storing instructions of claim 19, that cause the one or more processing resources to perform the method further comprising:

receiving the catalog of items and the notification associated with the transaction;

determining the set of protection plan offers to display in the live website associated with the merchant; and performing the action associated with the transaction and the protection plan.

* * * * *

UNITED STATES PATENT AND TRADEMARK OFFICE
CERTIFICATE OF CORRECTION

| | | |
|---|---|---|
| PATENT NO. | : 12,131,332 B2 | |
| APPLICATION NO. | : 18/066489 | |
| DATED | : October 29, 2024 | |
| INVENTOR(S) | : Woodrow Horwitz Levin et al. | |

It is certified that error appears in the above-identified patent and that said Letters Patent is hereby corrected as shown below:

In the Claims

Column 21, Line 54 (Claim 16, Line 2), change "plan protec-" to --plan,--; and

Column 21, Line 55 (Claim 16, Line 3), remove "tion,".

Signed and Sealed this
Third Day of December, 2024

Katherine Kelly Vidal
*Director of the United States Patent and Trademark Office*